Oct. 13, 1964   M. A. MacLEAN   3,152,416
SIGN CONSTRUCTION FOR ATTACHMENT TO THE SIDE, REAR
OR FRONT OF THE ROOF OF BUSES, STREETCARS
AND LIKE VEHICLES
Filed July 9, 1962                              4 Sheets-Sheet 1

INVENTOR.
MALCOLM A. MACLEAN
BY
Dike, Thompson, Bronstein & Mrose
ATTORNEYS

INVENTOR.
MALCOLM A. MACLEAN

United States Patent Office 3,152,416
Patented Oct. 13, 1964

3,152,416
SIGN CONSTRUCTION FOR ATTACHMENT TO THE SIDE, REAR OR FRONT OF THE ROOF OF BUSES, STREETCARS AND LIKE VEHICLES
Malcolm A. MacLean, Dorchester, Mass., assignor to B. R. Oster Corporation, Dorchester, Mass., a corporation of Massachusetts
Filed July 9, 1962, Ser. No. 208,202
13 Claims. (Cl. 40—129)

The present invention relates to an improved sign construction for attachment to the sides, rear or front of the roof of a bus, subway car, streetcar, railroad car or like vehicles, especially those in which such sides, rear or front of the roof are curvilinear in shape.

An object of the invention is to provide such a sign construction in which there are no pockets or sizable crevices in which leaves, twigs, dirt, water, etc., can collect.

Another object is to provide such a sign construction which is light in weight, which is simple and inexpensive to make and assemble and which can be easily attached and detached from the vehicle.

Another object is to provide such a sign construction which is so streamlined and attractive in appearance that it actually improves the overall appearance of the vehicle.

Another object is to provide such a sign construction in which the painted or printed sign can be inserted in and removed from the sign frame by a few simple manipulative movements without disassembling or taking apart any part of the sign frame and without the necessity of tools of any kind or hinged connections but yet in which the sign is held firmly and securely in the frame.

Other objects and advantages of the present invention will be apparent from the following description taken together with accompanying drawings in which:

FIGURE 4 is a section taken along the line 4—4 of FIG. 3;

Figure 1:
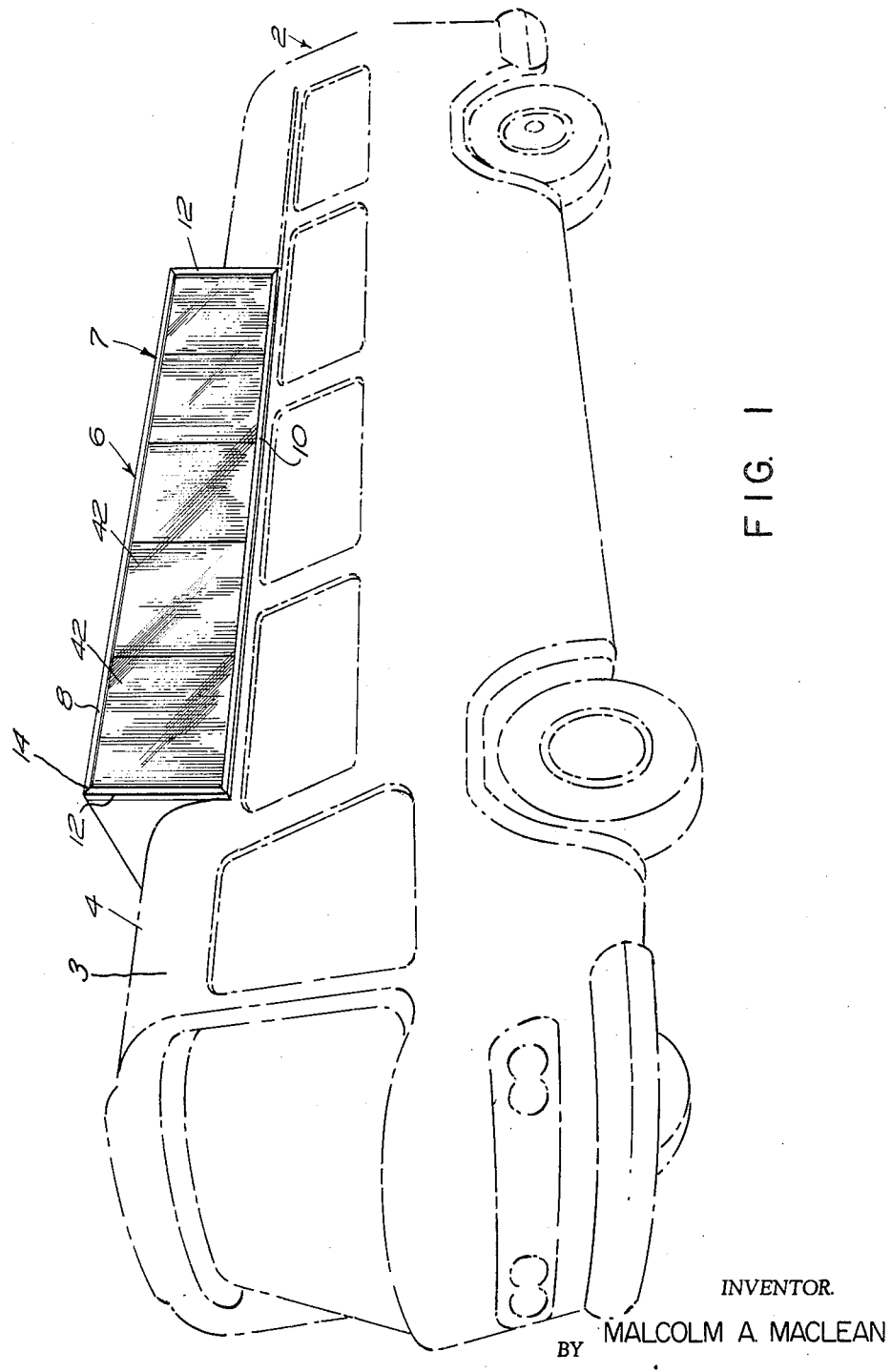
FIGURE 1 is a view in perspective of a bus having mounted on the side of the roof thereof a sign construction embodying the present invention, the bus being shown in broken lines.
Figure 2:
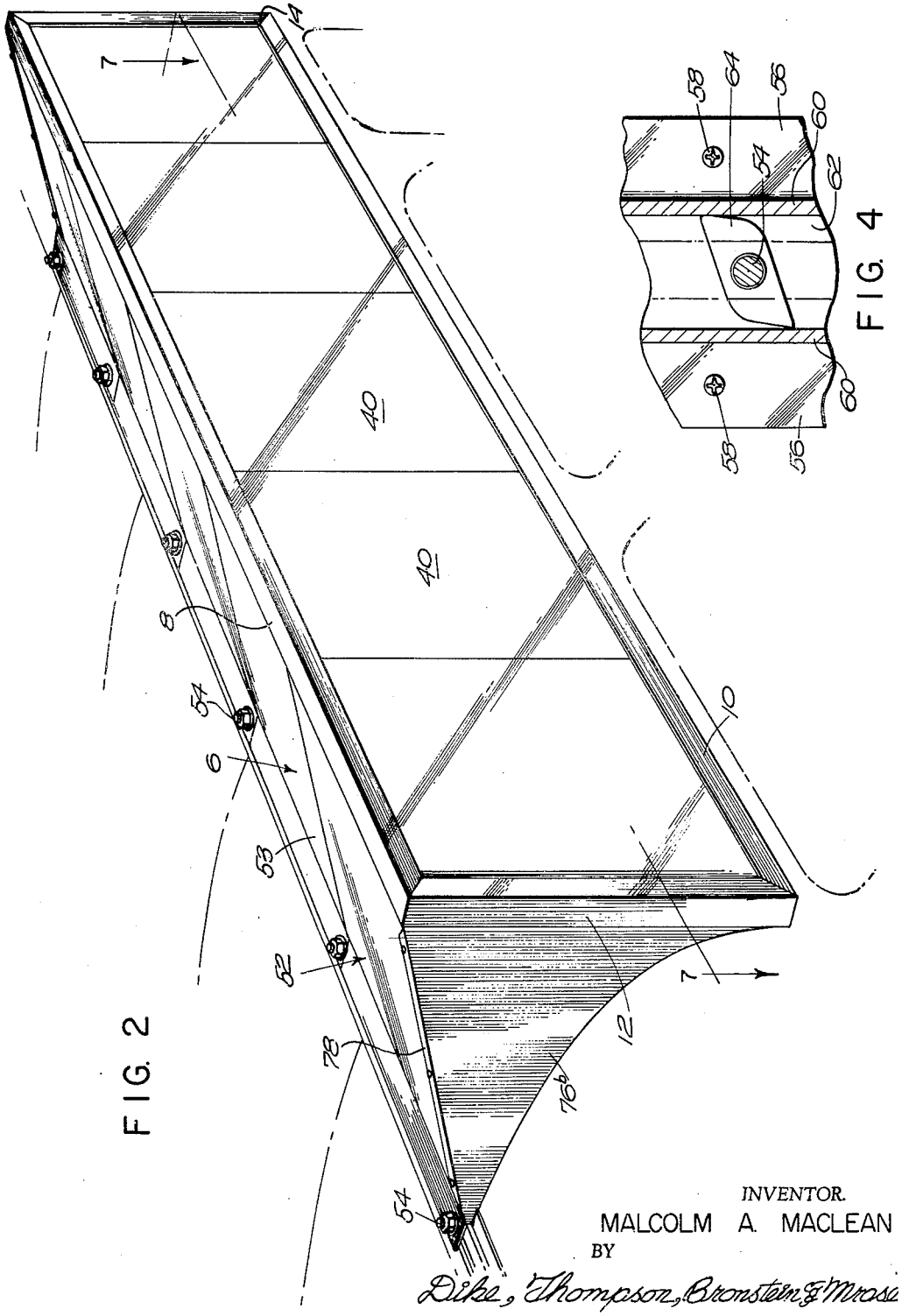
FIGURE 2 is a close-up view also in perspective showing in greater detail the sign construction of FIG. 1 and with the overlay panels on which the advertisement is printed removed from the frame.

With reference to the drawings, 2 represents a conventional bus having attached to the curvilinear side 3 of the roof 4 thereof a vertically disposed sign construction 6 embodying the present invention.

Sign construction 6 comprises a vertically disposed frame 7 made up of an elongated horizontal upper frame member 8, an elongated parallel horizontal lower frame member 10 and a pair of vertical side frame members 12. The joints between the ends of the upper, lower and side frame members where they come together are beveled or miter joints 14.

Figure 3:
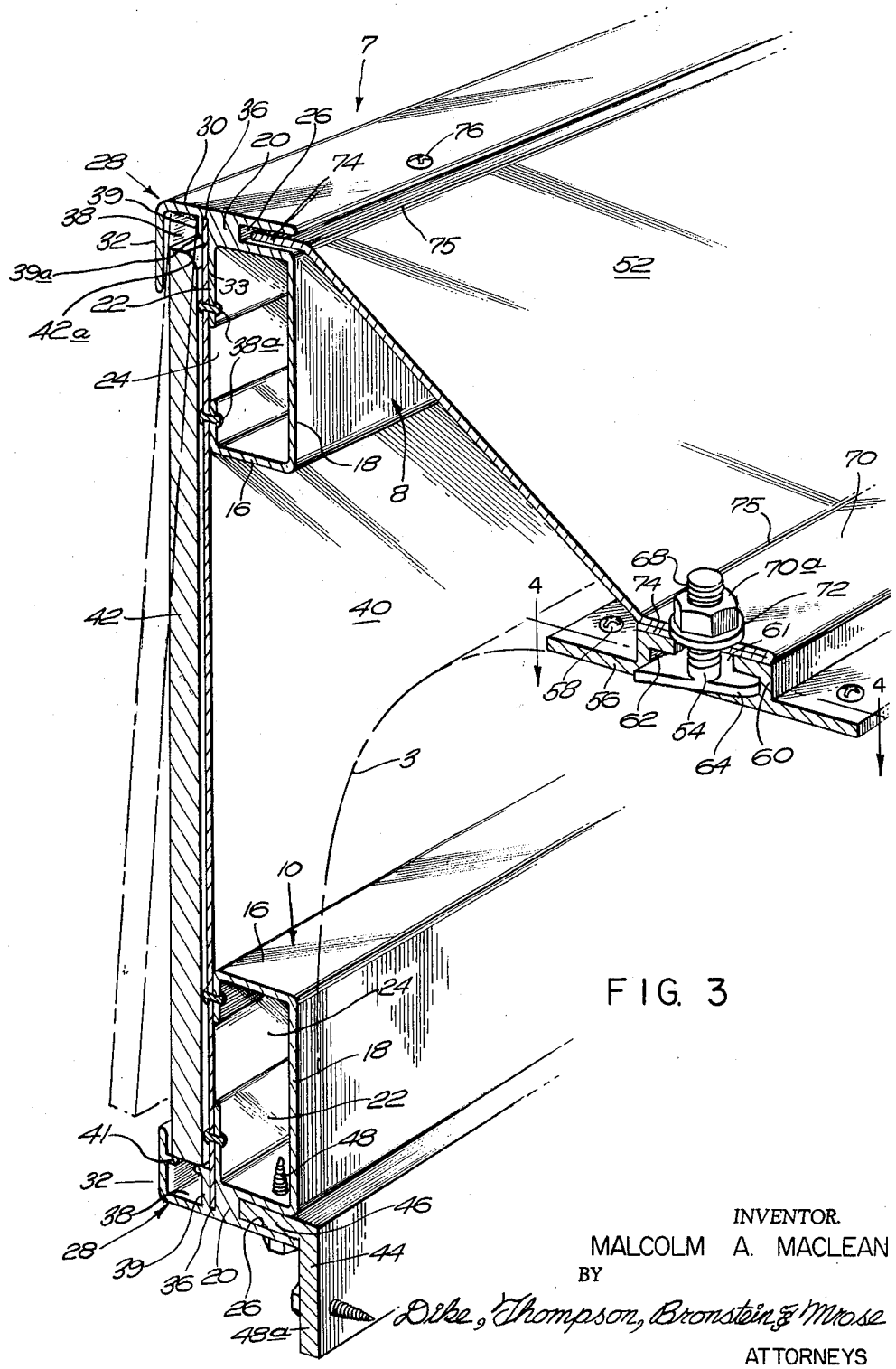
FIGURE 3 is an elevational cross-section in perspective of the sign construction of FIG. 2 showing in broken lines portions of the roof and side of the bus to which it is attached, showing also in broken lines an overlay panel on which the sign is painted or printed being moved into installed position in the frame and showing in full lines the overlay panel in its installed position.

The upper, lower and side frame members are made of extruded aluminum, are hollow and are generally rectangular in cross-sectional shape (see FIG. 3). They each have an inner wall 16, a rear wall 18, a thicker outer wall 20 and a front wall 22 having a longitudinal opening 24 extending along the length thereof. The outer portion of the rear surface of the rear wall 18 of each of the frame members has a groove 26 therein which extends along the length thereof and into the thick outer wall 20, as shown in FIG. 3.

The peripheral portion of the outer wall 20 of each of the frame members has a lip 28 extending forwardly at 30 and then inwardly at 32 in a direction generally parallel to the front surface 33 of the front wall 22 to form with the front surface of front wall 22 a channel which is partitioned into a narrow, rear groove 36 and a wider, front overlay channel 38 by a partition wall 39 extending inwardly from the portion 30 of lip 28 in a direction generally parallel to the front surface of front wall 22 a short distance into the channel formed by the lip and front wall of the frame member.

The edges of a plurality of thin, flat, aluminum backing panels 40 laid side by side in abutting relationship with respect to each other are received within the rear grooves 36 of the four frame members. The backing panels 40 are secured in place on the front walls 22 of the four frame members in side-by-side, abutting relationship with respect to each other and with the edges thereof in grooves 36, as aforesaid, by a plurality of rivets 38a at spaced intervals along the length of the frame members. The edges of the two end backing panels 40 are received within the grooves 36 of the upper, lower and side frame members, whereas the edges of the middle backing panels are received within the grooves 36 of the upper and lower frame members. A single backing panel can be used if desired. However, the use of a plurality of panels facilitates assembly. In any event, the backing panels or panel are framed by the four frame members. The overlay channel 38 of the lower frame member 10 has a raised floor 41 formed by a pair of in-turned, co-planar ledges extending toward each other from the top of partition wall 39 and from the portion 32 of lip 28. The upper and side frame members do not have this raised floor. The height of the raised floor 41 is such that when the flat, overlay panels 42 with the sign printed or painted or pasted thereon, rest on such floor, the upper edge portions of the overlay panels extend upwardly into the overlay channel of the upper frame member 8 above the lower end of lip 28 of the upper frame member so that the overlay panels are held in place in the frame, as shown in full lines in FIG. 3. This is the installed position of the overlay panels. However, when the overlay panels are so positioned, the upper edges thereof are spaced downwardly from the floor of the overlay channel of the upper frame member a sufficient distance so that they can be lifted vertically upwardly from the raised floor 41 a sufficient distance for the lower edges thereof to clear the lip 28 of the lower frame member 10, whereupon such lower edges of the overlay panels can be swung forwardly as shown in broken lines in FIG. 3 to remove the overlay panels from the frame without the necessity of tools of any kind, without the necessity of disassembling any part of the frame and without the necessity of hinged parts. New overlay panels can be inserted simply by moving the top edges thereof upwardly into the overlay channel in the upper frame member to the position shown in broken lines in FIG. 3 in which position the lower edges of the overlay panels clear the lip 28 of the lower frame member 10, whereupon such lower edges can be swung rearwardly over the overlay channel in the lower frame member and dropped onto the raised floor 41, in which position the upper edges of the overlay panels extend into the overlay channel in the upper frame member and the overlay panels are held in the frame. The lower front edge of partition wall 39 of the upper frame member is beveled at 39a and the upper rear edges of the overlay panels 42 are beveled at 42a to ensure against the upper edges of the overlay panels catching on the ends of the partition wall 39 during insertion thereof into the overlay channel 38 of the upper frame member.

In effect, the vertical height of the overlay panels is greater than the vertical distance between floor 41 of the overlay channel of the lower frame member and the lower tip of the lip 28 of the upper frame member but is less than the vertical distance between the floor of the overlay channel of the upper frame member and the upper tip of the lip 28 of the lower frame member.

The overlay panels 42 are located in side-by-side, abutting relationship, as shown in FIG. 1, the advertisement being painted or printed or pasted in parts on the overlay panels. The use of a plurality of overlay panels (at least three) facilitates insertion and removal from the frame. The edges of the end overlay panels are received in the overlay channels of the upper and lower frame members as well as the side frame members whereas the edges of the middle overlay panels are received only in the overlay channels of the upper and lower frame members. During assembly, the two end overlay panels are inserted, as aforesaid, between the upper and lower frame members and then are slid sideways into the overlay channels of the side frame members. Thereafter, the middle overlay panels are inserted, as aforesaid, between the upper and lower frame members.

The sign frame is supported on the side of the bus proof by means of an L-shaped lower bracket 44 (FIG. 3), one horizontal leg 46 of which fits snugly in the groove 26 of the lower frame member 10 and is secured therein by screws 48 at spaced intervals along the lower frame member, and the other leg 48a of which extends vertically downwardly along the vertical side wall of the butt adjacent to and just below the curved portion 3 forming the curvilinear side of the bus roof.

Whereas the lower frame member 10 is located along and secured to such side wall of the bus, the sign frame 6 extends vertically upwardly beyond the bus roof 4 so that the upper frame member 8 is located vertically higher than the bus roof 4. It is secured to the bus roof by means of a plurality of flat support panels 52 located in side-by-side, abutting relationship with respect to each other, bolts 54 and an elongated track member 56, which is bolted to the roof 4 by bolts 58.

Track member 56 comprises an elongated flat piece of rigid metal having a pair of walls 60 extending from the mid-portion thereof upwardly in parallel relationship with each other and then inwardly toward each other to form track 62. The walls 60 do not meet and therefore form an elongated slot 61 along the length of the track member. The track extends along the length of the roof and is preferably spaced sideways from the longitudinal center of the roof where the curvilinear side portion 3 of the roof has become relatively flat (see FIG. 3). Thus, the curvilinear side portion 3 of the roof extends between the track member 56 and the bracket 44.

During assembly, the cam-shaped heads 64 (FIGS. 3 and 4) of the plurality of bolts 54 are slid into either end of the track 62 to their proper positions with the threaded shanks 68 thereof extending vertically upwardly through the slot 61 of the track.

Turned-over edge portions 70 of the flat, inclined, support panels 52 are secured to the track member 56 by the bolts 54 extending through holes in such edge portions, nuts 70a and washers 72. Preferably, each support panel is secured by at least two bolts 54, the bolts being spaced along the track member 56. Tightening of the nuts 70a on the shanks 68 of bolts 54 forces the cam-shaped heads 64 to be rotated into locking engagement with the opposite walls 60 of the track 62 so that they become tightly wedged and locked between such opposite walls.

The opposite edge portions 74 (FIG. 3) of the support panels 52 extend horizontally into the groove 26 of the upper frame member 8. Edge portions 74 are secured in such groove 26 by a plurality of screws 76 spaced along the length of the upper frame member.

Although the main part of each support panel 52 is inclined as shown, the edge portions 70 and 74 are bent at bends 75 so that they extend generally in a horizontal direction and are generally parallel.

The plurality of side-by-side support panels 52 form a large panel assembly extending along the length of the sign frame and covering the space between the vertical frame construction 7 and the curvilinear side 3 of the roof 4 between track member 56 and the lower bracket 44.

A pair of flat side panels 76b enclose the sides of such space. The edge portions of the side panels 76b are secured in the grooves 26 of the side frame members 12 by screws or rivets 76a. The side panels 76b extend from such edge portions rearwardly to the curved side 3 of the bus roof and the opposite edge portions thereof adjacent the curved side of the roof are contoured to fit such curved side of the roof. The upper edge portions of the side panels 76b have flaps 78 bent around the support panel assembly 52, as shown. Preferably such flaps are riveted to the panel assembly 52.

The side panels 76b and panel assembly 52 completely enclose the space between the vertical sign frame and the bus to thereby prevent leaves, twigs, dirt and water from collecting in such space. They cooperate with the frame construction to provide a pleasing, streamlined appearance which actually improves the overall appearance of the bus.

With the sign construction of the present invention, there are no pockets or spaces in which water, leaves, twigs and dirt can accumulate.

Furthermore, the signs can be prepared in the shop and can be simply and easily inserted in the frame, as aforesaid, in the field. Changing signs becomes a simple matter.

Figure 5:
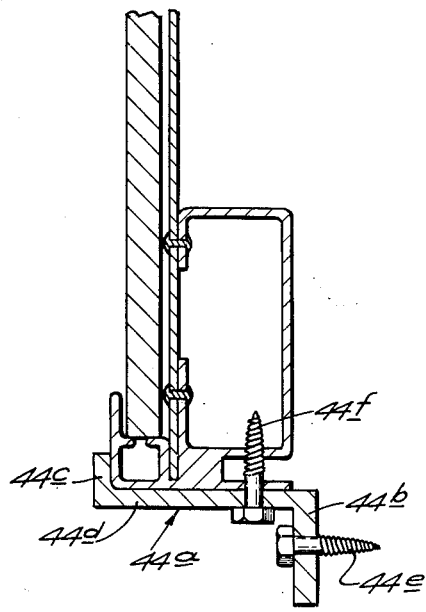
FIGURE 5 is a view in section like FIG. 3 of the lower part of the sign construction of FIG. 3 showing another embodiment of the lower bracket for attaching the sign construction to the bus.
Figure 6:
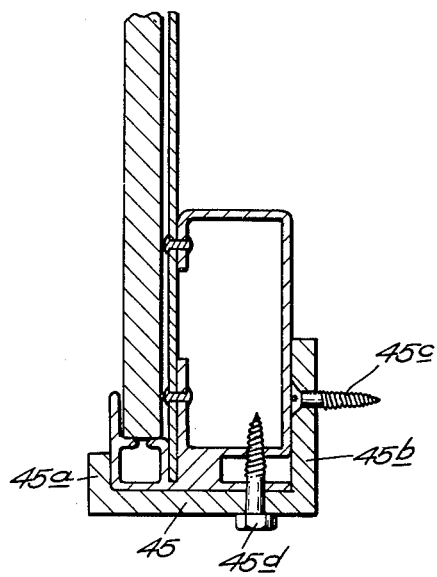
FIGURE 6 is a view like FIG. 5 of yet another embodiment of the lower bracket for attaching the sign to the bus.
Figure 7:
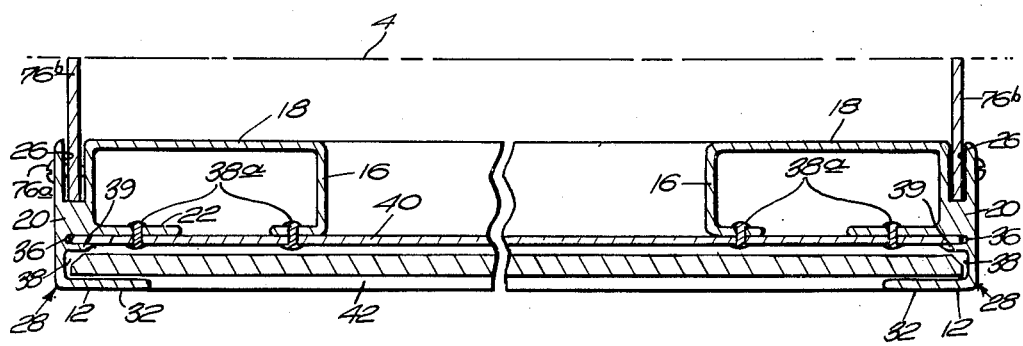
FIGURE 7 is a cross-sectional view taken along the line 7—7 of FIG. 2.

FIGS. 5 and 6 show two other embodiments of the bracket for securing the lower frame member 10 to the side wall of the bus.

In FIG. 5 the bracket 44a is S-shaped, the lower frame member 10 being supported on the horizontal middle leg 44d, with one end leg 44c extending upwardly along the outside of lip 28 of frame member 10 and the other leg 44b extending downwardly along the side of the bus and secured thereto by screws 44e. Lower frame member 10 is secured to the bracket by screws 44f.

In FIG. 6, the bracket 45 is U-shaped. The lower frame member 10 is received within the U of the bracket and is supported on the base of the U. One leg 45a of the U is shorter than the other leg 45b and extends upwardly along the outside of lip 28 of the lower frame member. The other leg extends upwardly along the vertical side wall of the bus and along the rear surface of the lower frame member and is secured to the side of the bus by screws 45c. The lower frame member is secured to the bracket by screws 45d.

The curved portion 3 is referred to herein as the side of the roof of the bus, as distinguished from the roof proper where it flattens out horizontally and as distinguished from the side wall of the bus where it flattens out vertically. As aforesaid, this curved portion extends from the track member 56 to the bracket 44.

Although the sign construction shown in the drawings is attached to the side of the roof of the bus, it may also be attached in substantially the same way to the front and rear of the roof. Also, it may be mounted in similar manner on a streetcar, railroad car, subway car or other like vehicles.

The sign construction of the present invention can be used with vehicles having roof constructions other than that shown in the drawings, e.g. roof constructions in which the side, front or rear of the roof, to which the sign construction is attached, is not curvilinear.

It is not intended that the invention be limited to the specific embodiments described above and shown in the accompanying drawings, such description and drawings being by way of example only, the invention being limited only by the following claims and the equivalents thereof.

I claim:

1. A sign frame construction for attachment to the side, rear or front of the roof of a bus, streetcar or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said means for attaching said panel means to the roof, including an elongated bracket secured to said roof and extending in the longitudinal direction of said sign frame and means for detachably attaching said panel means to said bracket, said bracket comprising a track for slidably receiving the heads of bolt members for attachment to said panel means.

2. A construction according to claim 1, said heads of said bolt members having a cam shape which is wedged between side walls of said track upon tightening said bolt member to thereby hold the bolt member in place in said track.

3. A sign frame construction for attachment to the side, rear or front of the roof of a bus, streetcar, or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said frame members comprising elongated hollow members which are generally rectangular in cross-sectional shape, said upper frame member having a groove extending along the length thereof for receiving an edge portion of said panel means and said side frame members having grooves extending along the length thereof for receiving edge portions of said side panels, said edge portions of the panel means and side panels being secured in said grooves.

4. A construction according to claim 3, said sign frame being adapted to be mounted on said vehicle with said upper frame member and the panel receiving groove therein located higher than said roof, said panel means being inclined from said groove to said roof, said edge portion of said panel means received in said groove and the opposite edge portion thereof attached to said roof, being bent at an angle to the inclination of said panel means.

5. A construction according to claim 4, said grooves being in the outer portion of the rear surfaces of said upper frame member and said side frame members and said bent edge portions of said panel means being generally horizontal.

6. A sign frame construction for attachment to the side, rear or front of the roof of a bus, streetcar, or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said means for supporting said lower frame member comprising an L-shaped bracket, the outer, lower portion of said lower frame member having a longitudinal groove receiving a leg of said L-bracket, said leg being secured in said groove, the other leg of said bracket extending along said vertical wall of said vehicle and being secured thereto.

7. A sign frame construction for attachment to the side, rear or front of the roof of a bus, streetcar, or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said means for supporting said lower frame member comprising a U-shaped bracket in which said lower frame member is received and secured, one of the legs of said U-bracket extending along said vertical wall of said vehicle and being secured thereto.

8. A sign frame construction for attachment to the side, rear or front of the roof of a bus, streetcar, or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said means for supporting said lower frame member comprising an S-shaped bracket, said lower frame member resting on the middle leg of said S-bracket and secured thereto with one leg of said Z-bracket extending upwardly along the front of said lower frame member and the other end leg extending downwardly along said vertical wall of said vehicle and secured thereto.

9. A sign frame construction for attachment to the side, rear or front of the roof of a bus, streetcar, or other like vehicle, said construction comprising a sign frame adapted to be mounted vertically at at least one of the side, rear and front of the roof of the vehicle, said sign frame having generally horizontal upper and lower frame members and a pair of vertical side frame members, means for supporting the lower frame member on a generally vertical wall of the vehicle adjacent to and below the roof thereof with the upper frame member spaced from said at least one of the side, rear and front of said roof to provide a space between said vertically disposed sign frame and said at least one of the side, rear and front of said roof, means for attaching the upper frame member to the roof of said vehicle, said last-mentioned means comprising panel means extending from said upper frame member to the roof, means for attaching said panel means to the upper frame member and means for attaching said panel means to the roof, said panel means when so attached to the upper frame member and roof, covering the top of said space, a pair of vertical side panels attached to said side frame members and extending therefrom to the portion of said vehicle located opposite said side frame members, the edges of said side panels adjacent said portion of said vehicle opposite said side frame members conforming to the contour of said portion of said vehicle, said panel means and side panels enclosing said space, said frame members comprising elongated hollow pieces which are generally rectangular in cross-sectional shape, each of said members having a lip extending forwardly from the front surface thereof along the periphery thereof and then inwardly in a direction generally parallel to said front surface to form a channel with said front surface, said channel being divided into a narrow, rear panel groove adjacent said front surface and a wider, front overlay channel by a partition wall extending inwardly from the floor of said channel generally parallel to said front surface, backing panel means located between and framed by said frame members, said backing panel means extending along said front surfaces of said frame members with the edges thereof received in said panel grooves, said backing panel means being secured in said position, overlay panel means adapted to be removably mounted in said sign frame with the edges thereof removably received within said overlay channels of said upper, lower and side frame members, the overlay channel of the lower frame member having a raised floor for supporting said removable overlay means received therein, the height of said overlay panel means being greater than the vertical distance between said raised floor and the lip forming the overlay channel of said upper frame member, but less than the vertical distance between the floor of the overlay channel of said upper frame member and the lip forming the overlay channel of said lower frame member, whereby said overlay panel means can be inserted and removed from the sign frame by inserting the upper edge thereof upwardly into the overlay channel of the upper frame member far enough for the lower edge to clear the lip of the overlay channel of the lower frame member, whereafter the overlay panel means may be dropped into the overlay channel of the lower frame member in a position in which it is supported on said raised floor and the upper edge thereof is located in the overlay channel of the upper frame member.

10. A sign frame construction according to claim 9, said raised floor of said overlay channel of said lower frame member being formed by ledges extending toward each other from the partition wall and upwardly extending portion of the lip of the lower frame member, said ledge being located above the forwardly extending portion of said lip.

11. A sign frame construction for attachment to the sides, rear or front of the roof of a bus, streetcar, or like vehicle, said construction comprising a sign frame having generally horizontal upper and lower frame members and a pair of vertical side frame members, means for supporting the lower frame member on a generally vertical wall of said vehicle adjacent to and below the roof thereof with said upper frame member spaced from said roof, means for attaching the upper frame member to the roof of said vehicle, said frame members comprising elongated hollow members which are generally rectangular in cross-sectional shape, an external surface of each of said upper and side members having a longitudinal groove therein for receiving panels extending from said members to said vehicle, each of said members having a lip extending forwardly from the front surface thereof along the periphery thereof and then inwardly in a direction generally parallel to said front surface to form a channel with said front surface, said channel being divided into a narrow rear groove adjacent said front surface and a wider front overlay channel by a partition wall extending inwardly from the floor of said channel in a direction generally parallel to said front surface, backing panel means located between and framed by said frame members, said backing panel means extending along said front surfaces of said frame members with the edges thereof received in said narrow rear grooves, said backing panel means being secured in said position, overlay panel means adapted to be removably mounted in said sign frame with the edges thereof removably received in said overlay channels of the upper, lower and side frame members, the overlay channel of the lower frame member having a raised floor for supporting said overlay panel means, the height of said overlay panel means being greater than the vertical distance between said raised floor and the lip forming the overlay channel of said upper frame member, but less than the vertical distance between the floor of the overlay channel of said upper frame member and the lip forming the overlay channel of said lower frame member, whereby said overlay panel means can be inserted and removed from the frame by inserting the upper edge thereof into the overlay channel of the upper frame member far enough for the lower edge to clear the lip of the overlay channel of the lower frame member, whereafter the overlay panel means may be dropped into the overlay channel of the lower frame member onto said raised floor, in which position the upper edge of said overlay panel means is located in the overlay channel of the upper frame member.

12. A sign frame construction according to claim 11, said raised floor of said overlay channel of said lower frame member being formed by a pair of ledges extending toward each other from the partition wall and the inwardly and upwardly extending portion of the lip of the lower frame member, said ledges being located above the forwardly extending portion of said lip.

13. A sign frame construction according to claim 11, said backing panel means comprising a plurality of panels located side by side with respect to each other in said frame and said overlay panels also comprising a plurality of overlay panels located side by side with respect to each other in said frame to thereby facilitate assembly and disassembly.

References Cited in the file of this patent

UNITED STATES PATENTS

| | | |
|---|---|---|
| D. 100,487 | Cheatwood | July 21, 1936 |
| D. 193,968 | Yarder | Nov. 6, 1962 |
| 1,752,591 | Ellis | Apr. 1, 1930 |
| 2,552,112 | Pierce | May 8, 1951 |
| 2,744,781 | Black | May 8, 1956 |
| 2,963,314 | Richardson | Dec. 6, 1960 |

FOREIGN PATENTS

| | | |
|---|---|---|
| 627,798 | Great Britain | Aug. 16, 1949 |